United States Patent Office 3,178,348
Patented Apr. 13, 1965

3,178,348
HYPOTENSIVE QUINOLINES
Robert Keith Bickerton, Oxford, N.Y., assignor to The Norwich Pharmacal Company, a corporation of New York
No Drawing. Filed Jan. 25, 1962, Ser. No. 168,820
6 Claims. (Cl. 167—65)

This invention relates to cardioregulatory compositions and a manner of utilization thereof in the treatment of cardiovascular abnormalities. More particularly this invention aims to provide hypotensive compositions useful in the treatment of hypertension.

The hypotensive compositions of this invention comprise certain quinoline derivatives which may be represented by the formula:

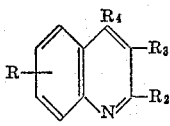

wherein

R is selected from the group consisting of hydrogen and from one to three substituents at positions 5, 6, 7 and 8 of the quinoline nucleus chosen from the group consisting of methoxy, ethoxy and methylmercapto;
$R_2$ and $R_4$ are each selected from the group consisting of hydrogen, hydroxy and methyl; and
$R_3$ is selected from the group consisting of hydrogen and hydroxy and pharmaceutically acceptable salts thereof; as the active ingredient in association with a suitable pharmaceutical carrier.

These compositions are potent blood pressure lowering agents on enteral or parenteral administration in far less than toxic dose to anesthetized or unanesthetized normotensive or hypertensive animals. When given orally or intravenously to anesthetized normotensive or hypertensive rats, rabbits, cats or dogs, a marked lowering of blood pressure is effected. A similar result attends similar administration to unanesthetized dogs or monkeys. The onset of action is rapid and its duration variable depending on the species of animal. A dose of these compositions containing as little as 5 mg./kg. of active ingredient elicits a blood pressure lowering effect.

No manifestation of toxic or adverse side effect attributable to the administration of these compositions is observed. Their $LD_{50}$ ranges from about 750–3000 mg./kg. upon peroral administration to mice. Freedom from undesirable side effects such as central stimulation or convulsive action is especially noteworthy.

The compositions of this invention are suitably dispensed in various dosage forms such as tablets, elixirs, suspensions, capsules, solutions, and the like using carrier and adjuvants known to the apothecary art and with which there is no incompatibility. Tablets, a very common dosage form, may be readily prepared by admixing the active ingredient with fillers and binders such as starch, dextrose, stearates, carbonates, kaolin, talc and the like and compressing in accordance with known tableting methods.

Solutions may be readily prepared using physiologically tolerable menstrua such as water and mixtures thereof with glucose, dimethylformamide, polyethylene glycols, and the like. In the preparation of solutions intended for parenteral use; e.g.; intravenous, the active ingredient is preferably utilized in the form of a salt. The acids which may be used for the formation of a salt are desirably those whose anions are relatively harmless to the animal organism. Appropriate acids may be inorganic or organic; such as hydrochloric, nitric, phosphoric, sulfuric, acetic, citric, malic and the like.

Capsules are readily prepared using acceptable encapsulation materials. E.g., gelatin, to carry the active ingredient. Gelatin capsules are available in a variety of sizes to suit the partciular animal species to whom administration is intended. The active ingredient is simply weighed in desired amount and placed within the appropriate capsule.

The currently preferred composition comprises 6,7-dimethoxy-4-quinolinol or a pharmaceutically acceptable salt thereof in association with a carrier therefor of a type hereinabove indicated.

Illustrative examples of these compositions are:
Hypotensive tablet—

| Ingredient: | Weight in mgs. |
|---|---|
| 6,7-dimethoxy-4-quinolinol | 100 |
| Sucrose | 25 |
| Starch | 22 |
| Acacin | 8 |
| Talc | 33 |
| Magnesium stearate | 2 |
| Stearic acid | 1 |

Solution—

| Ingredient: | Weight in gms. |
|---|---|
| 6,7-dimethoxy-4-quinolinol hydrochloride | 0.6 |
| Sterile distilled water | 100 |

Such a solution is especially suitable for intravenous infusion to anesthetized animals; the infused quantity being sufficient to provide a hypotensive dose of from 15–40 mg./kg. of active ingredient.

When the solution is administered per os by gavage, it is not necessary to employ sterile water. The quantity of solution administered by this route is generally sufficient to provide a dose of from 30–60 mg./kg. of active ingredient.

Gelatin capsule: 6,7-dimethoxy-4-quinolinol or a pharmaceutically acceptable salt thereof in an amount sufficient to provide a hypotensive dose of from 5–40 mg./kg. is weighed and placed in the capsule.

This form is particularly suited for oral administration to unanesthetized animals.

The specific performance of the preferred composition of this invention, 6,7-dimethoxy-4-quinolinol hydrochloride, when administered per os in gelatin capsule form to a group of ten unanesthetized hypertensive dogs in an experiment conducted in accordance with the well known crossover test is shown in the following table:

TABLE I

| Time post dosage in minutes | Mean Systolic Blood Pressures in mm. of Hg—Dose in mg./kg. | | | | |
|---|---|---|---|---|---|
| | 10 | 20 | 40 | 60 | 80 |
| 0 | 157 | 164 | 168 | 163 | 166 |
| 15 | 146 | 156 | 158 | 154 | 153 |
| 30 | 134 | 150 | 147 | 140 | 152 |
| 45 | 139 | 143 | 140 | 130 | 131 |
| 60 | 133 | 134 | 134 | 126 | 119 |
| 90 | 129 | 127 | 131 | 127 | 128 |
| 120 | 135 | 137 | 119 | 111 | 113 |
| 150 | 138 | 137 | 125 | 117 | 111 |
| 180 | 138 | 143 | 131 | 120 | 116 |
| 240 | 144 | 149 | 141 | 129 | 123 |
| 300 | 151 | 159 | 145 | 137 | 138 |
| 360 | 160 | 158 | 154 | 141 | 145 |
| 420 | | | 161 | 149 | 152 |

The following Table II illustrates the hypotensive character of these compositions when administered intravenously to anesthetized dogs or orally to unanesthetized dogs:

TABLE II

| Compound of Example | | Dose in mg./kg. | Route | Percent lowering of blood pressure | Duration of blood pressure lowering in minutes |
|---|---|---|---|---|---|
| I | | 15 | I.V. | 38 | 180 |
| III | ·HCl | 20 | I.V. | 68 | 345 |
| IV | ·HCl | 20 | I.V. | 9 | 25 |
| V | ·HCl | 20 | I.V. | 31 | 120 |
| VI | ·HCl | 20 | I.V. | 25 | 28 |
| VII | ·HCl | 20 | I.V. | 20 | 180 |
| VIII | ·HCl | 20 | I.V. | 8 | 20 |
| IX | ·HCl | 20 | I.V. | 60 | 90 |
| X | ·HCl | 20 | I.V. | 29 | 15 |
| XI | | 40 | Oral | 25 | 60 |
| XII | | 40 | Oral | 16 | 180 |
| XIII | ·Tosylate | 20 | I.V. | 42 | 210 |
| XIV | ·HCl | 20 | I.V. | 48 | 45 |
| XV | ·HCl | 20 | I.V. | 56 | 150 |

In order that the method of making the active ingredients of these compositions may be readily available to those skilled in the art, the following examples are appended:

Example I

6,7-DIMETHOXYCARBOSTYRIL

A. *3,4-dimethoxy-6-aminocinnamic acid.*—In a 22-l. three-necked flask, equipped with a stirrer, a reflux condenser and a thermometer, are placed 8.5 l. of water, 50 ml. of concentrated hydrochloric acid, 5.54 kg. (19.9 moles) of ferrous sulfate heptahydrate and 548 g. (2.16 moles) of 3,4-dimethoxy-6-nitrocinnamic acid. The mixture is stirred and heated to 90° C. before adding 4.4 l. (65 moles) of 28% aqueous ammonia over a 25 minute period. Vigorous stirring is maintained during the addition of ammonia. Stirring is continued at a moderate rate for an additional 45 minutes, before filtering the hot reaction mixture through a layer of filter aid on a large Büchner table-type funnel. The precipitate is washed with 1.5 l. of water and the combined filtrates are acidified to pH 5.2 with 910 ml. of concentrated hydrochloric acid. Before collecting the light brown crystalline solid, the mixture is allowed to stand one hour. The product is washed with three small portions of ice water and allowed to dry at 60° C. The yield of 3,4-dimethoxy - 6 - aminocinnamic acid is 190–212 g. (39–44%), M.P. 142–144° C.

B. *6,7-dimethoxycarbostyril.*—A mixture of 185 g. (0.83 mole) of crude 3,4-dimethoxy-6-aminocinnamic acid, 20 g. of charcoal and 3.2 l. of 4% hydrochloric acid are placed in a 5-l. three-necked flask fitted with a mechanical stirrer and a reflux condenser. The mixture is stirred and heated under reflux for 1.5 hours before filtering the hot reaction mixture through a preheated Büchner funnel. After cooling the filtrate in an ice bath, the pink colored crystals are collected and washed with enough 1% aqueous ammonia to remove the pink coloration. The crude, cream colored 6,7-dimethoxycarbostyril weighs 120–123 g. (70–72%), M.P. 230–231° C. This may be purified by recrystallizing from acetic acid.

Example II

6,7-DIMETHOXY-4-QUINOLINOL AND ITS HYDROCHLORIDE SALT 4-aminoveratrole (51 g.; 0.333 mole) and ethoxymethylene malonic ester (72 g.; 0.333 mole) are heated on a stream bath under reflux for 3 hours. The hot black liquid is poured into boiling "Dowtherm A" (1500 ml.) and the reaction mixture refluxed for 30 minutes. After cooling to room temperature a solid is precipitated by introducing hexane (3000 ml.). This material is washed with hexane and acetone yielding a tan solid (79 g.; yield 85.5%; M.P. 280–283° C.; after drying). The acid is obtained by refluxing the ester in 10% NaOH (300 ml.) for 2 hours. Charcoal is introduced and refluxing is continued for 10 minutes. After filtering, the filtrate is acidified with 1:1 HCl (200 cc.). The obtained solid is washed with hot water and subsequently with acetone yielding a tan material (65 g.; yield 91.5%; M.P. 273–4° C.). The decarboxylation of the acid is achieved by introducing it into boiling "Dowtherm A" (500 ml) and refluxing for 1 hour. The hot solution is filtered through a sintered glass funnel. A very small amount of insoluble black material is discarded. After cooling to room temperature, hexane (1:1) is introduced precipitating a semi-solid. This material washed with hexane after decanting. This semi-solid is recrystallized from ethanol using charcoal yielding a tan colored material (33 g.; yield 61.5%; M.P. 232–4° C.).

The hydrochloride is obtained by dissolving the free base in boiling methanol, cooling to room temperature, and introducing concentrated HCl (50 ml.). After filtering and washing with cold methanol, a white solid (36 g.; yield 92.7%; M.P. 267–268° C.) is obtained.

Example III

6,7-DIETHOXY-4-QUINOLINOL AND ITS HYDROCHLORIDE 1,2-diethoxy-4-nitrobenzene (30 g., 0.142 mole) is placed in a heavy walled bottle with 3 g. of 5% Pd on carbon and 230 ml. of ethanol. In 1 hour, 38.5 p.s.i.g of $H_2$ was absorbed on the Parr apparatus (theory 36.2). The catalyst is filtered off and washed with a small amount of ethanol.

In a 1.1, 3 neck flask is placed the above alcoholic solution and 30 g. (0.142 mole) of diethylethoxymethylene malonate is added. Nitrogen is bubbled through the mixture, which was heated on the steam bath to distill off ethanol.

After this time, 300 ml. of "Dowtherm A" is added and the temperature rapidly raised to 250° C. by heating with a mantle. The mixture is allowed to reflux for 30–40 minutes and the solution is then allowed to cool. The crystals that form are filtered and washed with hexane. There are obtained 18.6 g. (61% yield); M.P. 275–288° C.; of 6,7-diethoxy-4-hydroxyquinoline-3-carboxylic acid ethyl ester. This compound and its preparation are not a part of applicant's invention as they form a part of the inventive subject matter set forth in the copending application of E. J. Watson, Serial No. 380,058, filed July 2, 1964, assigned to the same assignee.

The above procedure is repeated with 4 additional 30 g. amounts of 1,2-diethoxy-4-nitrobenzene. The alcoholic solutions from the reductions are combined for reaction with diethylethoxymethylene malonate. From this, 55 g. of material is obtained, making in toto 73 g. of 6,7-diethoxy-4-hydroxyquinoline-3-carboxylic acid ethyl ester.

In a 1 l. flask is placed the above 73 g. and 300 g. of 10% NaOH. The mixture is refluxed for 2½ hours. Charcoal is added and the mixture filtered hot and allowed to cool. About 200 ml. of 1:1 HCl (100 ml. of concentrated HCl+100 ml. $H_2O$) is added until the solution is acid. A cream colored precipitate forms. It is filtered, washed with water and allowed to air dry overnight in the 110° C. oven. There are obtained 78 g.; M.P. 265–273° C.; of 6,7-diethoxy-4-hydroxyquinoline-3-carboxylic acid.

To 780 ml. of "Dowtherm A" heated to 250° C. are added the above 78 g. in small portions. The mixture is allowed to reflux for one hour and then to cool. To the mixture is added 1 liter of hexane, precipitating a dark brown sticky mass. The solvents are decanted. Trituration of the residue with 1 liter of petroleum ether causes most of the material to crystallize. This is filtered and further triturated with hexane. The solid is filtered and dried. There are obtained 61 g.; M.P. 95–105° C.

The above 61 g. is recrystallized from 600 ml. of boiling water. The hot water is decanted from the dark oil which upon cooling yields 18 g. of white crystals.

Further treatment of the oil with an additional 300 ml. of boiling water, decanting and cooling gives 14.5 g. of white crystals. Another treatment of the oil with a further 200 ml. of boiling water gives another 7 g. of white crystals. In this way, there are obtained 39.5 g. of 6,7-diethoxy-4-quinolinol.

The base can be converted into a salt by dissolving in methanol and adding concentrated hydrochloric acid. The hydrochloride has a M.P. of 249–251° C. (with dec.).

Example IV

6-METHOXY-4-QUINOLINOL AND ITS HYDROCHLORIDE p-Anisidine hydrochloride, 80 gm. (0.5 mole) is suspended in 300 ml. of ethanol and heated to 47° C. Diethyloxalacetate sodium salt, 110 gm. (0.525 mole), is added. The temperature drops to 37° C. The mixture is heated to 53° C. with stirring. The reaction mixture is allowed to cool to room temperature, and the salt is filtered off. The salt cake is washed with ethanol. There are obtained 28 gm. of NaCl (sodium chloride) (96% of theory).

The ethanol is removed from the filtrate at reduced pressure to give a gelatinous residue. This is diluted with 62 ml. of γ-chloronaphthalene and gradually introduced into a flask containing 160 ml. of γ-chloronaphthalene at 240° C. After all the material has been added to the reaction flask, the temperature of the γ-chloronaphthalene, which has fallen somewhat, is raised to 245° C. and maintained at this temperature for 10 minutes. The reaction mixture is allowed to cool to room temperature and 200 ml. of benzene is introduced. The solid which precipitates is filtered and washed with benzene. There are obtained 49 gm. (40% yield) of ethyl 4 - hydroxy - 6 - methoxy - quinoline - 2 carboxylate, M.P. 202–205° C.

The ethyl ester is saponified by heating with 500 ml. of 3 N NaOH solution on the steam bath for 2 hours. After this time, the reaction mixture is diluted with water to 1 liter, the insolubles removed by filtration and the 4 - hydroxy - 6 - methoxyquinoline - 2 - carboxylic acid precipitated from the filtrate by the addition of conc. HCl. There are obtained 27 gm. (62% yield), M.P. 288–289° C.

The carboxylic acid is decarboxylated by adding it in portions to 200 ml. of refluxing "Dowtherm A" and allowing the mixture to reflux for one hour. The reaction mixture is allowed to cool and is then triturated with 500 ml. of hexane. The solid obtained is filtered and washed with hexane yielding 20 gm. (94% yield) of 6-methoxy-4-quinolinol, M.P. 248–249° C.

The free base is dissolved in 250 ml. of methanol on the steam bath and 20 ml. of conc. HCl is added. The hot solution is diluted with an additional quantity of methanol, charcoal is added and the solution is filtered hot. Cooling produces 16 gm. of 6-methoxy-4-quinolinol hydrochloride (67% yield), M.P. 252–262° C. Upon concentrating the mother liquor to ca. 100 ml., another 4.35 gm. are obtained, M.P. 238–255° C. Total yield—20 gm., 84% over-all yield—19%. This may be recrystallized from ethanol.

Example V 6,8-DIMETHOXY-4-QUINOLINOL AND ITS HYDROCHLORIDE

In a 1 liter 3 neck flask are placed 204 g. (1.33 moles) of 2,4-dimethoxyaniline and 287 g. of diethylethoxymethylene malonate. Nitrogen is slowly bubbled through the reaction flask. The mixture is heated on the steam bath and ethanol is removed by distillation.

"Dowtherm A" 2.5 liters, is placed in a 5 liter 3 neck flask and heated to 250° C. The above material is added slowly through a dropping funnel. After all is added, the mixture is allowed to reflux for 30 min. It is then allowed to cool. The crystalline solid is filtered off and washed with hexane yielding 173 g. (47% yield) of 6,8 - dimethoxy - 4 - hydroxy - quinoline - 3 - carboxylic acid ethyl ester.

The ester is refluxed for 2 hours with 672 ml. of a 10% sodium hydroxide solution. The mixture is treated with charcoal, filtered hot, cooled in an ice bath and acidified with 400 ml. of 1:1 hydrochloric acid (200 ml. of conc. hydrochloric acid and 200 ml. of water). A tan precipitate is filtered off and allowed to dry. Heating this at 300° C. with benzophenone for 10 minutes, then cooling and adding benzene gives 108 g. of a dark colored material, whose infra-red spectrum shows it to be crude 6,8-dimethoxy-4-quinolinol.

Most of this material (75 g.) is converted to the hydrochloride by dissolving in 2.5 liters of methanol, filtering hot, treating with charcoal and adding 30 ml. of conc. hydrochloric acid. The addition of ether causes the appearance of crystals of the hydrochloride (57 g.). The hydrochloride is dissolved in about 250 ml. of water and made basic with 10% sodium carbonate solution. After cooling in the refrigerator overnight, the free base is filtered off, washed with water, allowed to dry and then converted to the hydrochloride as above. In this way there are obtained 25 g. of material which analyzes for 6,8-dimethoxy-4-quinolinol hydrochloride. The melting point is 225–236° C. (dec.).

Example VI

7-METHOXY-4-QUINOLINOL AND ITS HYDROCHLORIDE m-Anisidine (102 g., 0.83 mole) and ethoxymethylenemalonic ester (179 g., 0.83 mole) are introduced into a 1 liter three necked flask equipped with stirrer and descending condenser. Nitrogen is bubbled in while heating on the steam bath. The reaction time is 2.5 hrs. The collected ethanol (40 ml.) corresponds to 83% of theory. The residue is a viscous oil. This material is introduced dropwise into preheated (210° C.) "Dowtherm" (400 ml.) while bubbling in nitrogen. The temperature is brought to 240° C. and maintained at 240–247° C. for 20 minutes. The contents of the flask are allowed to cool to room temperature with stirring, filtered and washed with carbon tetrachloride (200 ml.). There are obtained 73 g., M.P. 280–285° C. The overall yield is 35.6%. This crude ester (73 g., 0.295 mole) and 800 ml. 10% NaOH are introduced into a 1 liter three necked flask, and refluxed for 1.5 hrs. After cooling to room temperature, the mixture is filtered and the filtrate made acid with conc. HCl. This is digested on a steam bath for 5 minutes, cooled, filtered and washed with water. The crude acid (98 g., M.P. 257–260° C.) is refluxed in benzophenone (300 g.) for 15 minutes, cooled and triturated with benzene. The insoluble black material is extracted three times with boiling water. On cooling, there are obtained 10 g. of solid. This is dissolved in ethanol (200 ml.) and treated with charcoal. HCl gas is introduced into the filtrate. There is obtained 1 g. of hydrochloride, M.P. 259–265° C.—which may be recrystallized from ethanol.

*Analysis.* — Calculated: N, 6.62%; Cl, 16.80%. Found: N, 6.40%, 6.46%; Cl, 16.64%, 16.74%.

Example VII 6,7-DIMETHOXYQUINOLINE HYDROCHLORIDE

A mixture of 11 g. (0.05 mole) of 2-chloro-6,7-dimethoxyquinoline, 4 g. (0.05 mole) of anhydrous sodium acetate and 3 g. of 5% Pd/C in 150 ml. of ethanol is hydrogenated in a low pressure apparatus. After the equivalent amount of hydrogen is introduced (70 mins.), the catalyst and sodium chloride are filtered, and the filtrate acidified with 4.5 ml. of concentrated hydrochloric acid. The precipitate is collected by filtration and recrystallized from methanol. The yield of 6,7-dimethoxyquinoline hydrochloride is 5.4 g. (48%), M.P. 245–247° C.

Example VIII

5,8-DIMETHOXY-2-METHYL-4-QUINOLINOL HYDROCHLORIDE 2,5-dimethoxyaniline (153 g., 1.0 mole), ethylacetoacetate (132 g., 1.01 moles) and three drops of conc. HCl are heated on a steam bath for 2 hrs. "Dowtherm" (400 ml.) is added and the mixture refluxed for 1 hr. Addition of petroleum ether and hexane precipitates a black oil. The solvent is decanted and ethanol added to the residue. HCl gas is then introduced. There are obtained 40 g. of hydrochloride, M.P. 195–197° C., which may be recrystallized from ethanol to give 17 g. of 5,8-dimethoxy-2-methyl-4-quinolinol hydrochloride, M.P. 217° C. (dec.).

Example IX

6,7-DIETHOXY-2-METHYL-4-QUINOLINOL AND ITS HYDROCHLORIDE 3,4-diethoxynitrobenzene (92 g., 0.435 mole) is reduced in two portions (31 g. and 61 g.) in ethanol using 5% Pd on carbon as catalyst. The filtrates are combined and ethylacetoacetate (5% g.–0.45 mole) is introduced. The alcohol is evaporated on a steam bath. One drop of conc. HCl is introduced and the mixture heated on a steam bath for 3 hrs. "Dowtherm" (200 ml.) is added, and the mixture refluxed for 45 min. After cooling, it is triturated with hexane and the solvent decanted. The product is a semisolid. It is triturated with ethyl acetate. There are obtained 40 g. M.P. 246–255° C., representing an over-all yield of 37% which may be recrystallized from a mixture of water and methanol (M.P. 259–260° C.).

Part of the crude 6,7-diethoxy-2-methyl-4-quinolinol is heated in boiling ethanol and treated with charcoal. HCl gas is introduced into the filtrate to give the hydrochloride (M.P. 278–280° C.).

Example X

6,7-DIMETHOXY-3-QUINOLINOL HYDROCHLORIDE

A mixture of 23.4 g. (0.1 mole) of 6,7-dimethoxy-3-nitroquinoline, acetic acid (200 ml.), and 3 g. of 5% palladium on carbon is shaken with hydrogen at an initial pressure of 50 p.s.i. for ½ hr. The catalyst is removed by filtration. Saturation of the filtrate with dry hydrogen chloride gives a nearly colorless solid. The solid is collected on a funnel, washed with acetone and dried by suction. The crude material weighs 24 g. and melts at 264–265° C.

The crude 6,7-dimethoxy-3-aminoquinoline hydrochloride (16.8 g., 0.07 mole) is dissolved in a solution of 200 ml. of hot water and 12 ml. of concentrated hydrochloric acid. The solution is chilled to 5° C. A cold solution of 5.5 g. of sodium nitrite in 45 ml. of water is added in portions while keeping the temperature at about 5° C. The mixture is allowed to stand for 5 minutes after the addition is complete and then heated at 60–70° C. until nitrogen evolution ceases. After cooling to room temperature, the solution is made basic with solid sodium bicarbonate and extracted 6 times with 100 ml. portions of chloroform. The chloroform extracts are dried with anhydrous magnesium sulfate for 15 minutes and filtered. Crude 6,7-dimethoxy-3-quinolinol hydrochloride is precipitated as a yellow solid by passing dry hydrogen chloride into the chloroform extract. The yield of crude product (M.P. 238–240° C.) is 10.1 g. (60%).

After recrystallization from methanol-ether, the compound had a greenish-yellow color and melted at 240–241° C.

Example XI

6,7-DIMETHOXY-4-METHYL-2-QUINOLINOL

A melt of 60 g. (0.39 mole) of 4-aminoveratrole is maintained at 160–165° C. during the addition, with stirring, of 100 g. (0.77 mole) of ethylacetoacetate over a period of 20 minutes in an open 500 ml. flask. The resulting solution is maintained at 160–165° C. for an additional 30 minutes, then excess acetoacetate is removed by distillation from a water bath at reduced pressure. The residue is treated (in a cold water bath) with 100 ml. of concentrated sulfuric acid and the reaction mixture heated to 90–95° C. for 15 minutes. The resulting mass is cooled to 60° C. and poured into 1 liter of ice water. Filtration, followed by recrystallization of the filter cake from 50% aqueous ethanol, yielded 57 g. (82%) of the title product as a yellowish powder, M.P. 234–237° C.

Example XII

7-METHYLTHIO-4-QUINOLINOL 3-methylmercaptoaniline (100 g., 0.71 mole) and diethylethoxymethylene malonate (154 g., 0.71 mole) are introduced into a 1 liter three necked flask equipped with stirrer and descending condenser. Nitrogen is introduced while heating on a steam bath. The reaction time is 2.5 hrs. Thirty-six ml. of EtOH are collected. "Dowtherm" (400 ml.) is introduced. The contents of the flask are heated to reflux that is maintained for 45 minutes. After cooling to room temperature, hexane is introduced. A black oil is obtained that does not crystallize. The hexane is decanted and the oil is triturated with ethanol. A solid material (58 g., M.P. 290–293° C.) is obtained.

The above material is introduced into a 2 liter flask containing a solution of NaOH (130 g.) in water (1700 ml.). Some water (350 ml.) is distilled off in order to remove the "Dowtherm." The contents of the flask are refluxed for 5 hrs. After filtering while hot from some insoluble material, the filtrate is made acid with concentrated hydrochloric acid. The precipitate is filtered and washed with water. Thus, 66 g., M.P. 272–276° C., are obtained.

The above acid is introduced into boiling "Dowtherm" (250 ml.) and the mixture refluxed for 1 hr. with constant stirring. The hot "Dowtherm" is filtered. The filtrate is triturated with hexane. The solid (39 g., M.P. 167–173° C.) is filtered and washed with the same solvent. It may be recrystallized from ethanol using charcoal. This gives 30 g., M.P. 180–183° C. which may be again recrystallized from ethanol to give 7-methylthio-4-quinolinol (M.P. 182–184° C.)

Example XIII

4-HYDROXY-6,7-DIMETHOXY-1-METHYLQUINOLINIUM p-TOLUENESULFONATE

In a 500 ml. flask are placed 10 g. (0.05 mole) of 6,7-dimethoxy-4-quinolinol, 9.3 g. (0.05 mole) of methyl p-toluenesulfonate and 200 ml. of diglyme (diethylene glycol diethyl ether). The mixture is refluxed for 2 hrs. It is allowed to cool and a gummy solid obtained by precipitating with benzene. Trituration with tetrahydrofuran gives 13.84 g. of a crystalline solid (72% yield of crude product). This material is recrystallized from 300 ml. of acetonitrile (1.32 g. of insoluble material was removed by filtration) to yield 4.58 g. of the title compound, M.P. 223–228° C. (24% over-all yield).

Example XIV

5,6,7-TRIMETHOXYQUINALDINE HYDROCHLORIDE

A. *3,4,5-trimethoxyaniline.*—1,2,3-trimethoxy 5 - nitrobenzene (60 g., 0.286 mole) in ethyl acetate (180 cc.) is hydrogenated using 5% Pd on carbon (3.5 g.) as catalyst. After completion of the reaction more ethyl acetate is introduced, the mixture filtered and the catalyst washed with additional amounts of solvent. After evaporating to dryness, the residue is heated in boiling hexane and ethyl acetate is introduced till all is in solution. On cooling a white solid 42.0 g. (81.2%), M.P. 114.5–115° C. is obtained.

B. *5,6,7 - trimethoxyquinaldine hydrochloride.*—3,4,5-trimethoxyaniline (42.6 g., 0.233 mole), conc. HCl (90 g.) and paraldehyde (68 g., 0.515 mole) are heated on a steam bath in a three-necked round bottom flask equipped with a reflux condenser, for 1.5 hrs. Undesired material is steam distilled. Further impurities are eliminated by basifying with a 26% NaOH solution (200 cc.) and steam distilling again. The residue is extracted several times with ether. After drying the combined ether extracts, the solvent is evaporated. The residue could not be crystallized from petroleum ether or benzene. After evaporating the solvent under reduced pressure, the residue is dissolved in ether (anhyd.) and dry HCl gas is introduced. A black solid precipitates. This material is dissolved in ethanol, treated with charcoal and precipitated with ligroin. A gray material (14.4 g., 22.9%, M.P. 192–193° C.) is obtained which may be recrystallized from a mixture of ethanol and ligroin to give the title compound (M.P. 194.3–195° C.).

*Example XV*

6,7-DIMETHOXYLEPIDINE HYDROCHLORIDE HEMIHYDRATE

A suspension of 24 g. (0.102 mole) of 2-chloro-6,7-dimethoxylepidine and 7.5 g. of 5% Pd/C in 200 ml. of ethanol is hydrogenated in a Parr apparatus at an initial pressure of 50 p.s.i.g. Over a period of 4 hrs., 9 p.s.i.g. of hydrogen is absorbed. The suspension is filtered and the filtrate evaporated using a water aspirator. The residue is dissolved in hot isopropanol and the solution saturated with dry hydrogen chloride. The precipitate is filtered and dried in air to yield 19 g. (92% yield) of title product, M.P. 223–224° C. dec.

*Example XVI*

6,7-DIMETHOXY-2-METHYL-4-QUINOLINOL HYDROCHLORIDE 4-aminoveratrole (76.5 g., 0.5 mole), ethylacetoacetate (65 g., 0.5 mole) and four drops of conc. HCl are heated on a steam bath for 5 hrs. "Dowtherm" (200 ml.) is introduced and the contents of the flask are refluxed for 45 min. After cooling to room temperature, the contents of the flask are triturated with hexane yielding a semi-solid. The hexane is decanted. This treatment is repeated three times. The obtained material is dissolved in hot ethanol and conc. HCl is introduced. The flask is cooled and the precipitate is filtered and washed with ethanol and with anhydrous ether yielding 35 g. of the title compound, M.P. 274–278° C. (dec.). The over-all yield is 27.4%.

Since it will be apparent to those skilled in the art that departures from the foregoing disclosure and examples may be made without changing the scope and the spirit of this invention; the description herein given of it is to be accorded an illustrative and not a limitative significance.

This application is a continuation-in-part of my application of Serial No. 87,778, filed February 8, 1961, now abandoned.

What is claimed is:

1. The method of lowering blood pressure in animals which comprises internally administering thereto in dosage unit form a composition consisting of a pharmaceutical carrier and as the added active ingredient a compound selected from the group consisting of a quinoline having the formula:

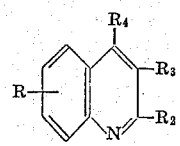

wherein
R is selected from the group consisting of hydrogen and from one to three substituents at positions 5, 6, 7 and 8 of the quinoline nucleus chosen from the group consisting of methoxy, ethoxy and methylmercapto;
$R_2$ and $R_4$ are each selected from the group consisting of hydrogen, hydroxy and methyl; and
$R_3$ is selected from the group consisting of hydrogen and hydroxy;
and the pharmaceutically acceptable mineral acid addition and p-toluensulfonate salts thereof; said active ingredient being in an amount sufficient to supply a dose of from 2 to about 100 mg./kg.

2. The method of lowering blood pressure in hypertensive animals which comprises internally administering thereto in dosage unit form a composition comprising a pharmaceutical carrier and as the added active ingredient 6,7-dimethoxy-4-quinolinol hydrochloride in an amount sufficient to supply a dose of about 5 to about 40 mg./kg.

3. The method of lowering blood pressure in hypertensive animals which comprises internally administering thereto in dosage unit form a composition comprising a pharmaceutical carrier and as the added active ingredient 6,7-dimethoxycarbostyril hydrochloride in an amount sufficient to supply a dose of about 5 to 40 mg./kg.

4. The method of lowering blood pressure in hypertensive animals which comprises internally administering thereto in dosage unit form a composition comprising a pharmaceutical carrier and as the added active ingredient 6,7-dimethoxy-4-quinolinol sulfate in an amount sufficient to supply a dose of about 5 to 40 mg./kg.

5. The method of lowering blood pressure in hypertensive animals which comprises internally administering thereto in dosage unit form a composition comprising a pharmaceutical carrier and as the added active ingredient 6,7-diethoxy-4-quinolinol hydrochloride in an amount sufficient to supply a dose of about 5 to 40 mg./kg.

6. The method of lowering blood pressure in hypertensive animals which comprises internally administering thereto in dosage unit form a composition comprising a pharmaceutical carrier and as the added active ingredient 6,7-dimethoxyquinoline hydrochloride in an amount sufficient to supply a dose of about 5 to 40 mg./kg.

References Cited in the file of this patent

UNITED STATES PATENTS

| | | |
|---|---|---|
| 2,558,211 | Elderfield | June 26, 1951 |
| 2,813,872 | Schmutz | Nov. 19, 1957 |
| 2,940,974 | Surrey | June 14, 1960 |

OTHER REFERENCES

Chemical Abstracts 40: 5744 (1946); 41: 757h (1947); 45: 4721e (1951); 46: 4007f (1952); 49: 6258i (1955); and 50: 3444c (1956).